(12) United States Patent
Yoo et al.

(10) Patent No.: US 11,221,728 B2
(45) Date of Patent: Jan. 11, 2022

(54) DEVICE FOR PROVIDING CONTACT SCENARIO MANAGEMENT INTERFACE

(71) Applicant: MINDS LAB INC., Daejeon (KR)

(72) Inventors: Tae Joon Yoo, Incheon (KR); Ha Young Lee, Gyeonggi-do (KR); Han Gyul Yu, Gyeonggi-do (KR); Hong Seop Choi, Gyeonggi-do (KR)

(73) Assignee: MINDS LAB INC., Daejeon (KR)

( * ) Notice: Subject to any disclaimer, the term of this patent is extended or adjusted under 35 U.S.C. 154(b) by 0 days.

(21) Appl. No.: 17/039,417

(22) Filed: Sep. 30, 2020

(65) Prior Publication Data

US 2021/0333947 A1    Oct. 28, 2021

Related U.S. Application Data

(63) Continuation of application No. PCT/KR2020/005678, filed on Apr. 29, 2020.

(30) Foreign Application Priority Data

Apr. 28, 2020    (KR) .......................... 10-2020-0051829

(51) Int. Cl.
*G06F 3/0481*    (2013.01)
(52) U.S. Cl.
CPC ................................. *G06F 3/0481* (2013.01)
(58) Field of Classification Search
CPC ........... G06F 3/0481; G06F 8/34; H04L 51/02
See application file for complete search history.

(56) References Cited

U.S. PATENT DOCUMENTS

| 10,628,133 | B1* | 4/2020 | Jiang | .................... G10L 15/1822 |
| 2015/0262188 | A1* | 9/2015 | Franco | ................ H04M 3/5158 |
| | | | | 705/7.21 |
| 2018/0376003 | A1* | 12/2018 | Shinseki | .............. G06Q 30/016 |
| 2019/0138600 | A1* | 5/2019 | Krishnan | ............... G06F 3/0482 |
| 2019/0138879 | A1* | 5/2019 | Hu | ......................... G06N 5/043 |
| 2019/0187961 | A1* | 6/2019 | Myung | ..................... G06F 8/34 |
| 2019/0354358 | A1* | 11/2019 | Nelson | ................ G06F 9/44526 |
| 2020/0227029 | A1* | 7/2020 | McConnell | ............ G06N 3/006 |

FOREIGN PATENT DOCUMENTS

| KR | 1020010082790 | 8/2001 |
| KR | 1020050010099 | 1/2005 |
| KR | 1020060027003 | 3/2006 |
| KR | 1020070101013 | 10/2007 |
| KR | 101199311 | 11/2012 |

OTHER PUBLICATIONS

International Search Report for International Application PCT/KR2020/005678, dated Jan. 28, 2021.

\* cited by examiner

*Primary Examiner* — Mong-Shune Chung
(74) *Attorney, Agent, or Firm* — Burris Law, PLLC

(57) ABSTRACT

A device for providing an interface for managing contact scenarios for one or more respondents may provide a first interface for inputting contact information of one or more respondents to be contacted, provide a second interface for inputting a scenario of the contact, and provide a third interface for displaying on a screen a contact simulation according to the scenario.

9 Claims, 6 Drawing Sheets

FIG. 4

Simple Bot Builder

CONTACT INFORMATION | Excel Upload | Excel Sample Download | 2020.03.23 19:40 Updated | SAVE

| ORDER | NAM | CONTACT INFORMATION | SCENARIO | CONTACT METHOD | CONTACT TIME | NUMBER OF RETRIES |
|---|---|---|---|---|---|---|
| 1 | HONG, GIL-DONG | 010-1234-5678 | SCN-01 | VOICE CALL | 14:00~18:00 | THREE TIMES |
| 2 | KIM, GIL-DON | 010-2234-5678 | SCN-03 | TEXT MESSAGE | 08:00~18:00 | EIGHT TIMES |
| 3 | CHOI, YOUNG-HEE | 010-3234-5678 | SCN-03 | XX MESSENGER | 08:00~18:00 | ONCE |

520

500

DEVICE FOR PROVIDING CONTACT SCENARIO MANAGEMENT INTERFACE

CROSS-REFERENCE TO RELATED APPLICATIONS AND PRIORITY

The present application is a continuation of PCT Application No. PCT/KR2020/005678, filed on Apr. 29, 2020, which claims priority to and the benefit of Korean Patent Application No. 10-2020-0051829, filed on Apr. 28, 2020, the disclosures of which are incorporated herein in their entireties by reference.

TECHNICAL FIELD

One or more embodiments relate to a device for providing a contact scenario management interface that performs contact with one or more respondents input by a user according to a scenario input by the user, and provides a result of the contact to the user.

BACKGROUND

Consumers who purchase various products such as electronic products, financial products, and travel products or service vouchers call a contact center (or consultation center) of the manufacturer or retailer to make inquiries about a product or service, or a defect or breakdown in the product or service.

Most companies operate such a consultation center by themselves to respond to or handle consumer complaints or inquiries.

However, from the standpoint of companies, providing services through the operation of such a consultation center is inevitably burdensome in terms of cost in that it requires hiring a large number of workers.

In addition, in the case of a small-sized company, it is difficult to hire an appropriate number of counseling personnel because the amount of counseling varies according to time or season. When a counselor is hired based on the peak counseling season, there is a problem in that the cost of counseling personnel is unnecessarily high during the off-peak counseling season, and when a counselor is hired based on the off-peak counseling season, there is a problem in that counseling cannot be handled properly during the peak counseling season.

SUMMARY

In order to solve the above-described problems of the present disclosure, one or more embodiments provide a contact system that may be operated with only a minimum number of counseling personnel.

In addition, one or more embodiments provide a contact system in which a contact center is operated by a third party and detailed consultation according to a user's scenario design is possible.

One or more embodiments include a device for providing an interface for managing contact scenarios for one or more respondents. The device provides a first interface for inputting contact information of one or more respondents to be contacted, provides a second interface for inputting a scenario of the contact, and provides a third interface for displaying on a screen a contact simulation according to the scenario.

The device may further provide a fourth interface for displaying a response result of the one or more respondents to the scenario.

The first interface may include at least one of a contact method selection interface for selecting a contact method for each of the one or more respondents, a contact time zone selection interface for selecting a contact time for each of the one or more respondents, and a retry number selection interface for selecting the number of contact retries for each of the one or more respondents.

The second interface may include a task input interface for inputting a main task and one or more subtasks dependent on the main task, a main task editing interface for editing the main task, and a task switching condition editing interface for inputting a condition for switching a task from the main task to the one or more subtasks and a response to a respondent at the time of the switching.

The main task editing interface may include an interface for inputting query contents for a respondent.

The second interface may include a task structure window for displaying a connection relationship between a first object corresponding to the main task and second objects respectively corresponding to the one or more subtasks.

The device may modify the scenario according to a user's edit input for one or more objects displayed in the task structure window.

The device may move one or more second objects dependent on the first object together with the second object according to a movement input of the first object by the user.

The third interface may include a chat window for displaying a conversation history according to the scenario.

According to one or more embodiments, a contact system may be operated with only a minimum number of counseling personnel.

In addition, according to one or more embodiments, the contact center is operated by a third party, but detailed consultation may be performed according to the user's scenario design.

In addition, according to one or more embodiments, a user may easily create or edit a consultation scenario through a graphical user interface (GUI).

In addition, according to one or more embodiments, each task performed through a contact is expressed as an object, and a connection relationship between the objects is displayed. Thus, the scenario (or execution process) of the contact may be more intuitively displayed.

In addition, one or more embodiments provide a simulation interface for verifying a scenario, and in particular, a scenario may be more easily verified by displaying a task currently being executed.

BRIEF DESCRIPTION OF THE DRAWINGS

FIG. 4 shows an example of a screen of a user terminal on which a first interface is displayed, according to an embodiment;

DETAILED DESCRIPTION

Figure 1:
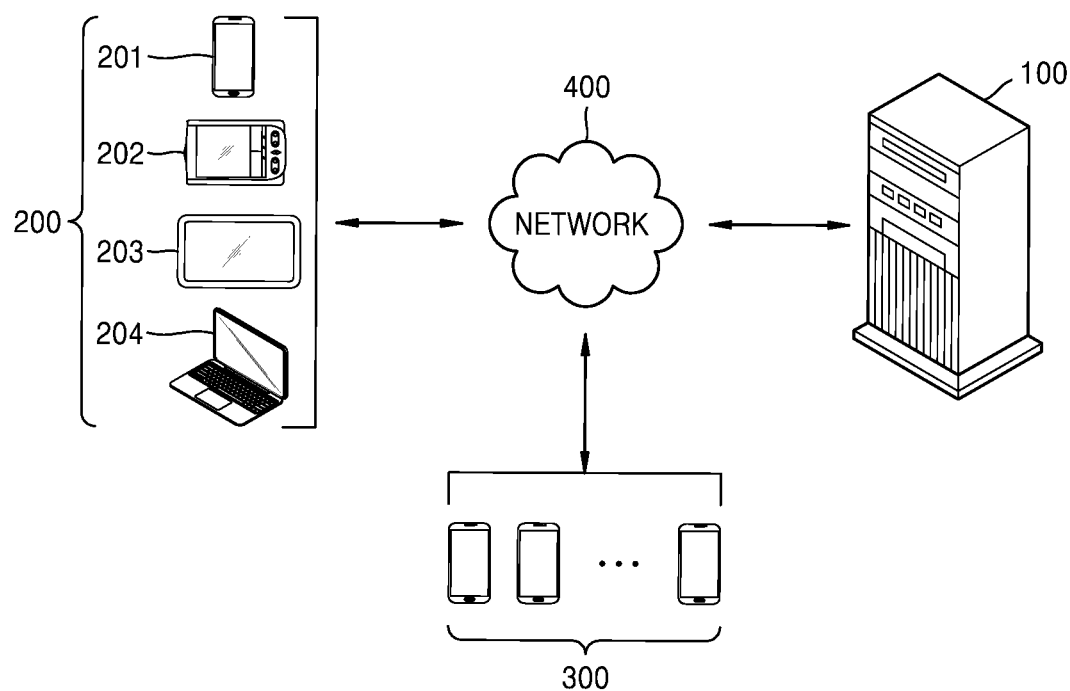
FIG. 1 is a diagram schematically illustrating a configuration of a contact system, according to an embodiment.

A device for providing an interface for managing contact scenarios for one or more respondents according to an embodiment may provide a first interface for inputting contact information of one or more respondents to be contacted, a second interface for inputting a scenario of the contact, and a third interface for displaying on a screen a contact simulation according to the scenario.

As embodiments allow for various changes and numerous embodiments, example embodiments will be illustrated in the drawings and described in detail in the written description. Effects and features of the present disclosure, and a method of achieving them will be apparent with reference to the embodiments described later below in detail together with the drawings. The present disclosure may, however, be embodied in many different forms and should not be construed as limited to the example embodiments set forth herein.

Hereinafter, embodiments will be described in detail by explaining example embodiments with reference to the attached drawings. Like reference numerals in the drawings denote like elements, and redundant descriptions thereof are omitted.

In the following embodiments, terms such as "first," and "second," and the like are not used in a limiting meaning, but are used for the purpose of distinguishing one component from another component. In the following embodiments, an expression used in the singular encompasses the expression of the plural, unless it has a clearly different meaning in the context. In the following embodiments, it is to be understood that the terms such as "including," "having," and "comprising" are intended to indicate the existence of the features or components described in the specification, and are not intended to preclude the possibility that one or more other features or components may be added. Sizes of components in the drawings may be exaggerated for convenience of explanation. In other words, since sizes and thicknesses of components in the drawings are arbitrarily illustrated for convenience of explanation, the following embodiments are not limited thereto.

FIG. 1 is a diagram schematically illustrating a configuration of a contact system, according to an embodiment.

The contact system according to an embodiment may perform contact with one or more respondents input by the user according to a scenario input by the user, and may provide a result of the contact to the user. As illustrated in FIG. 1, the contact system may include a server 100, a user terminal 200, a respondent terminal 300, and a communication network 400.

In the present disclosure, a "contact" may mean contacting a respondent according to a certain purpose to make queries to the respondent, and obtaining a response from the respondent.

In the present disclosure, a "user" is a person who wants to make a contact with one or more respondents, and may be, for example, a service operating entity who wants to obtain feedback from multiple respondents on a service provided by the user.

In the present disclosure, the user and the administrator (or administration subject) of the contact system may be different persons (or corporations). In an embodiment, the contact system may include a system for providing a service for performing a contact to one or more respondents according to a user's request, and obtaining a response from the respondents accordingly. In other words, the contact system according to an embodiment may provide a service of performing a contact on behalf of the user according to a user's request.

In the present disclosure, a "respondent" is a person to be contacted, and may be singular or plural. The respondent may be, for example, a person who uses a service provided by the user described above.

The user terminal 200 and the respondent terminal 300 according to an embodiment may include a device of various types that mediates a person and the server 100 so that the user and the respondent may each use various services provided by the server 100.

For example, the user terminal 200 may receive an interface for inputting various contact-related matters from the server 100 and provide it to the user, and obtain a user's input therefor and transmit it to the server 100. In addition, the respondent terminal 300 may receive a contact message from the server 100, obtain a respondent's response thereto, and transmit it to the server 100.

The terminals 200 and 300 may include, for example, portable terminals 201, 202, and 203 such as the user terminal 200 shown in FIG. 1, or a computer 204. However, such a terminal form is an example, and the spirit of the present disclosure is not limited thereto, and a means for providing content to a user and accepting a user's input therefor may correspond to the terminals 200 and 300 of the present disclosure.

The terminals 200 and 300 according to an embodiment may include a display means for displaying content or the like to perform the above-described function, and an input means for obtaining a user's input for such content. In this case, the input means and the display means may be configured in various ways. For example, the input means may include a keyboard, a mouse, a trackball, a microphone, a button, a touch panel, and the like, but are not limited thereto.

In an embodiment, a user and/or a respondent may each be singular or plural. Accordingly, each of the user terminal 200 and/or the respondent terminal 300 may be plural or singular. It is shown in FIG. 1 that the user terminal 200 is singular and that the respondent terminal 300 is plural. However, this is for convenience of description, and the spirit of the present disclosure is not limited thereto.

The communication network 400 according to an embodiment may provide a path through which data may be transmitted and received between each component of the system. The communication network 400 may include, for example, a wired network such as local area networks (LANs), wide area networks (WANs), metropolitan area networks (MANs), integrated services digital networks (ISDNs), and a wireless network such as wireless LANs, code-division multiple access (CDMA), Bluetooth, satellite communication, and the like. However, the scope of the present disclosure is not limited thereto.

The server 100 according to an embodiment may perform contact with one or more respondents input by the user according to a scenario input by the user, and may provide a result of the contact to the user.

Figure 2:
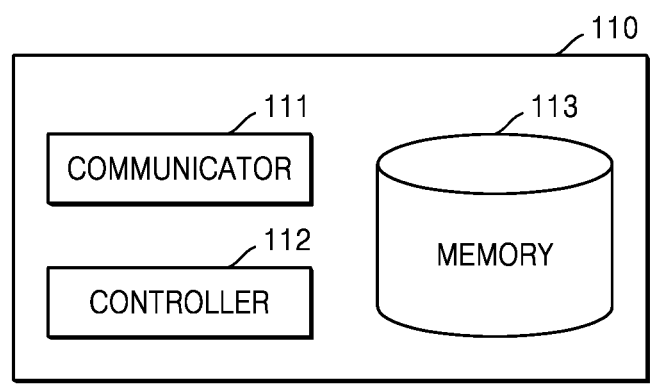
FIG. 2 is a diagram schematically illustrating a configuration of a contact scenario management interface providing device provided in a server, according to an embodiment.

FIG. 2 is a diagram schematically illustrating a configuration of a contact scenario management interface providing device 110 in the server 100, according to an embodiment.

Referring to FIG. 2, the contact scenario management interface providing device 110 according to an embodiment may include a communicator 111, a controller 112, and a memory 113. In addition, although not shown in FIG. 2, the contact scenario management interface providing device 110 according to the present embodiment may further include an input/output unit, a program storage unit, and the like.

The communicator 111 may include a device including hardware and software that is necessary for the contact scenario management interface providing device 110 to transmit and receive a signal such as control signals or data signals through a wired or wireless connection with another network device such as the terminals 200 and 300.

The controller 112 may include devices of all types that are capable of processing data, such as a processor. Here, a "processor" may include, for example, a data processing device that is embedded in hardware having a circuit physically structured to perform a function represented by a code or command included in a program. A data processing device embedded in the hardware may include, for example, a processing device such as microprocessors, central processing units (CPUs), processor cores, multiprocessors, and application-specific integrated circuits (ASICs), and field-programmable gate arrays (FPGAs), but the scope of the present disclosure is not limited thereto.

The memory 113 temporarily or permanently stores data that is processed by the contact scenario management interface providing device 110. The memory may include a magnetic storage medium or a flash storage medium, but the scope of the present disclosure is not limited thereto. For example, the memory 113 may temporarily and/or permanently store contact scenarios received from the user terminal 200.

Figure 3:
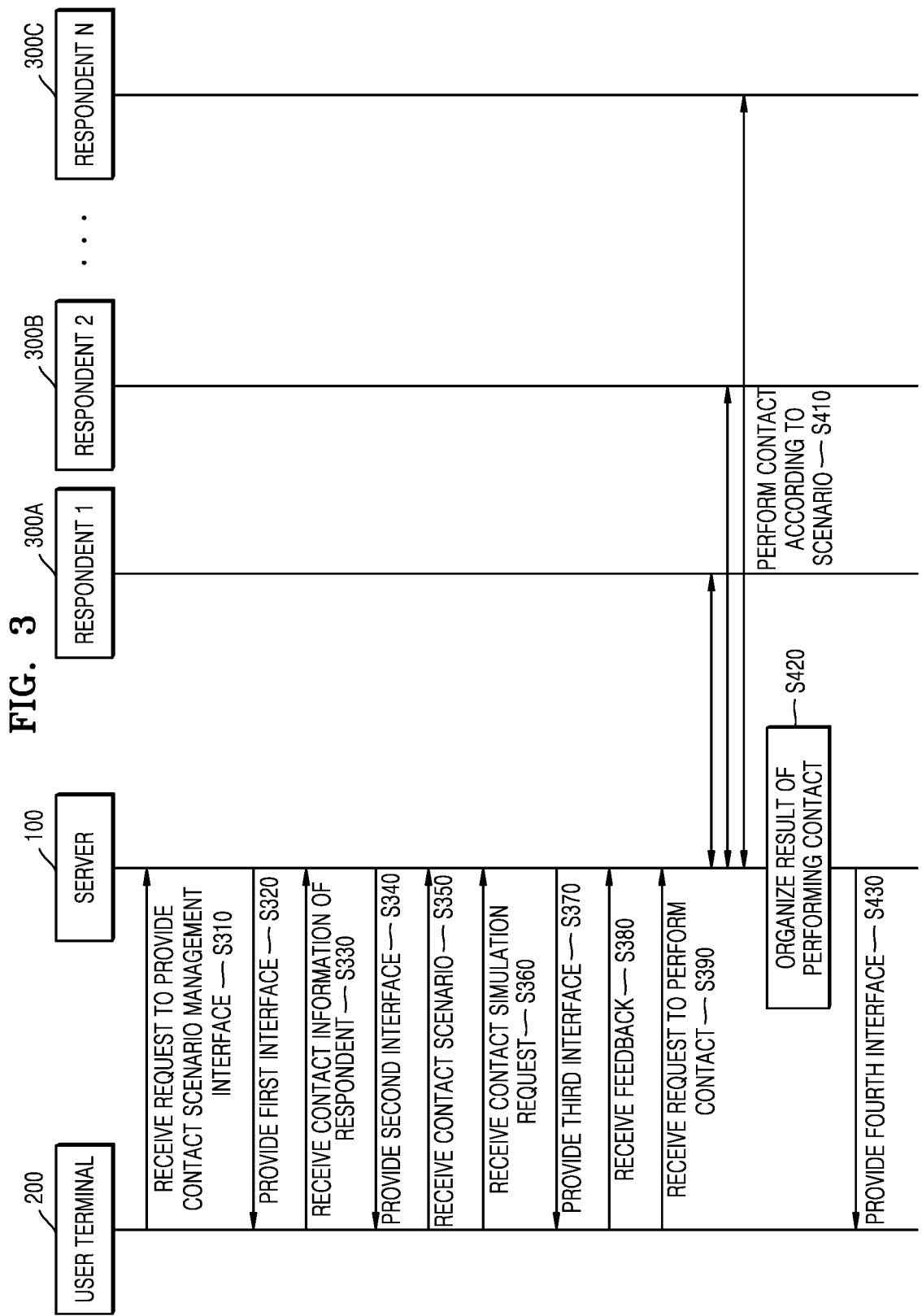
FIG. 3 is a flowchart of a method of providing a contact scenario management interface, performed by a server, according to an embodiment.

FIG. 3 is a flowchart of a method of providing a contact scenario management interface performed by the server 100, according to an embodiment. Hereinafter, a method of providing a contact scenario management interface performed by the server 100 including the contact scenario management interface providing device 110 is described with reference to FIG. 3 and FIGS. 4 to 6 each illustrating an example interface.

The server 100 according to an embodiment may receive a request to provide a contact scenario management interface from the user terminal 200, in operation S310.

As described above, the server 100 according to an embodiment may include a device that provides a service for performing a contact according to a request of an individual user. Therefore, the user may input (or upload) a target (i.e., the respondent) to be contacted and a contact scenario to the server 100 so that the server 100 performs a contact.

In other words, the server 100 according to an embodiment may perform contact for multiple respondents according to a scenario requested by the user.

The user terminal 200 according to an embodiment may send a request to provide a contact scenario management interface to the server 100 by logging on to a service provided by the server 100.

Of course, the user terminal 200 may also send a request to provide a contact scenario management interface to the server 100 by accessing a specific webpage provided by the server 100. However, this is merely an example, and the spirit of the present disclosure is not limited thereto.

Upon receiving the request in step S310, the server 100 according to an embodiment may provide a first interface to the user terminal 200, in operation S320.

In the present disclosure, a "first interface" may mean an interface through which a user inputs a target to be contacted. For example, the first interface may be an interface for inputting contact information of one or more respondents to be contacted.

FIG. 4 is an example of a screen 500 of the user terminal 200 on which a first interface is displayed, according to an embodiment.

Referring to FIG. 4, the first interface may include a button interface for inputting contact information with a pre-input file, and an interface 520 for inputting a contact according to a user input (e.g., a keyboard input).

At this time, the interface 520 may include a scenario selection interface for selecting a contact scenario for each of one or more respondents, a contact method selection interface for selecting a contact method for each of one or more respondents, a contact time zone selection interface for selecting a contact time for each of one or more respondents, and a number-of-retries selection interface for selecting the number of contact retries for each of the one or more respondents.

The user may set different contact scenarios for individual respondents by using the interface 520, and may set different contact methods, contact times, and number of retries.

In an embodiment, some of the detailed interfaces included in the interface 520 may be omitted. For example, in an embodiment, the interface 520 may not include the scenario selection interface among the aforementioned detailed interfaces.

Meanwhile, the user may input the respondent's contact information, etc. by uploading a file in which items related to the respondent are previously input, through the button interface. At this time, items respectively corresponding to the detailed interfaces described above may be previously input to the uploaded file.

The server 100 according to an embodiment may receive the contact information of one or more respondents from the user terminal 200 as the user inputs the contact information of one or more respondents through the interface and/or interface 520 on the screen 500, in operation S330.

The server 100 according to an embodiment may temporarily and/or permanently store the received contact information of the one or more respondents in the memory 113, and use it to perform contact in operation S410 to be described later below.

The server 100 according to an embodiment may provide a second interface to the user terminal 200 following the first interface, in operation S340.

In the present disclosure, a "second interface" may mean an interface for inputting a contact scenario. As described above, in the present disclosure, the "contact scenario" may mean a data set including contents to be queried to a respondent through a contact. In addition, the contact scenario may include contents of a query that are selectively used according to a respondent's answer.

Figure 5:
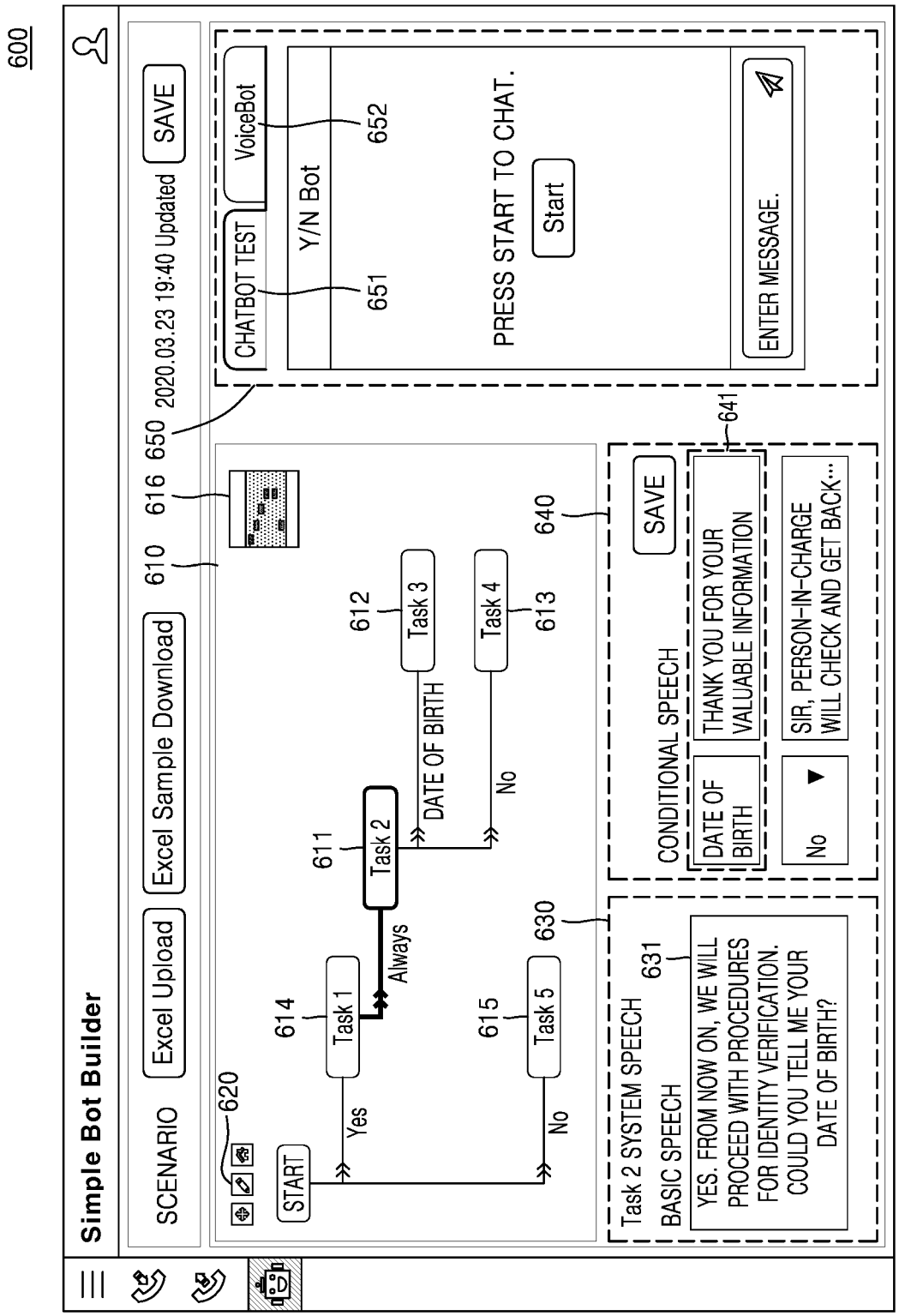
FIG. 5 shows an example of a screen of a user terminal on which a second interface and a third interface are displayed, according to an embodiment.

FIG. 5 is an example of a screen 600 of the user terminal 200 on which a second interface and a third interface are displayed, according to an embodiment.

Referring to FIG. 5, the second interface may include a task input interface 620 for inputting a main task and one or more subtasks subordinate thereto, a main task editing interface 630 for editing the main task, and a task switching condition editing interface 640 for inputting a condition for switching the main task to one or more subtask, and inputting an answer to the respondent at the time of the switching.

In addition, the second interface may further include a task structure window 610 that displays a connection relationship between a first object and second objects, the first object corresponding to a main task input by a user through the task input interface 620, and the second objects respectively corresponding to the one or more subtasks.

In a selective embodiment, the second interface may further include a scenario map 616 showing all tasks included in the scenario.

In the present disclosure, a "main task" and a "subtask" may be a relative concept that is set according to a reference position. For example, based on the object 611, tasks respectively corresponding to objects 612 and 613 may each correspond to a subtask. Of course, a task corresponding to the object 611 may correspond to a main task.

However, based on an object 614, a task corresponding to the object 611 may correspond to a subtask.

The user may input, through the task input interface 620, tasks included in the scenario as objects 611 to 615 respectively corresponding to the tasks included in the scenario. In this case, the user may set a dependency relationship and/or order between the tasks by inputting (or setting) a connection relationship between the input objects 611 to 615.

For example, by connecting the object 611 to each of the objects 612 and 613 as shown in FIG. 5, the user may input the task corresponding to the object 611 as the main task, and the tasks respectively corresponding to the objects 612 and 613 as subtasks for the main task.

Meanwhile, the user may edit details of the main task by using the main task editing interface 630. For example, the user may input contents of a query of the main task through an interface 631 for inputting contents of a query to a respondent, the interface 631 being included in the main task editing interface 630.

The user may also input, through the task switching condition editing interface 640, a condition for switching a task from a main task to one or more subtasks, and an answer to a respondent at the time of the switching. At this time, the "answer to a respondent" may mean an response that the server 100 wants to provide to the respondent when the respondent responds.

For example, the user, by using an interface 641 for editing the first subtask (Task 3), may input a condition that the response of the respondent includes a date of birth, as a condition for switching from the main task (Task 2) to a first subtask (Task 3), and input "Thank you for your valuable information" as the response to the respondent.

The user may modify a contact scenario by editing the objects on the task structure window 610. In other words, the server 100 according to an embodiment may modify the contact scenario according to a user's edit input for one or more objects displayed in the task structure window 610.

For example, according to a user's input of selecting and dragging the object 615 to a subordinate location of the object 615, the server 100 may move the object 611 and the objects 612 and 613 subordinate thereto to locations subordinate to the object 615. At this time, the server 100 may maintain, in terms of location change, the dependency relationship between the object 611 and the objects 612 and 613 as it is. The scenario may be modified according to the movement of the objects 611, 612, and 613.

In addition, the server 100 may modify a scenario according to an input of deleting and/or adding an object or may modify a scenario according to an input of changing a dependency relationship and/or connection relationship between each of the objects. However, such user's inputs are examples, and the spirit of the present disclosure is not limited thereto.

The server 100 according to an embodiment, as the user inputs a contact scenario to the second interface on the screen 600, may receive the contact scenario from the user terminal 200 in operation S350. The server 100 according to an embodiment may temporarily and/or permanently store the received contact scenario in the memory 113, and use it to perform contact in operation S410, which will be described later, or to perform contact simulation in operations S370 to S380.

Meanwhile, that a process of receiving contact information of a respondent according to operations S320 and S330 precedes a process of receiving a contact scenario according to operations S340 and S350 is an example, and in another embodiment, the process of receiving a contact scenario may be performed prior to the process of receiving contact information of a respondent.

The server 100 according to an embodiment may receive a contact simulation request from the user terminal 200 in operation S360, and may provide a third interface for displaying a contact simulation screen according to the scenario received in operation S350, in operation S370. In addition, the server 100 may receive a user's feedback during a process of performing a simulation, in operation S380, and provide a response according to the scenario.

Referring back to FIG. 5, a third interface 650 may include interfaces 651 and 652 for selecting a contact method to be used for simulation. The user may select the interface 651 to perform a simulation by using a chatbot or may select the interface 652 to perform a simulation by using a voicebot (i.e., a voice call). Although not shown in FIG. 5, the user may select an interface (not shown) corresponding to a specific messenger service to perform a simulation by using the corresponding messenger service.

When the user selects the interface 651, a chat window displaying a chat history of a chat between the chatbot and the user according to the scenario may be displayed on the screen 600. In this case, the server 100 may distinguishably display a message generated by the chatbot according to the scenario, and a test input message of a user for the message generated by the chatbot.

In a selective embodiment, the server 100 may distinguishably display a task currently being executed from the remaining tasks according to the simulation process. For example, the server 100 may distinguishably display an object corresponding to a task currently being executed from the other objects displayed in the task structure window 610 by, for example, coloring in a different color, applying a flickering effect, or thickening the border of the object.

During the process of performing a simulation, the user may check whether a contact is appropriately performed according to the intended scenario, and may correct the scenario through the second interface when necessary.

As described above, in the present disclosure, a user may easily create or edit a scenario through a GUI. In addition, according to the present disclosure, each task performed through a contact is expressed as an object, and a connection relationship between the objects is displayed. Thereby, a scenario (or execution process) of the contact may be more intuitively displayed. Further, the present disclosure provides a simulation interface for verifying a scenario, and in particular, a task currently being executed is displayed so that the scenario may be more conveniently verified.

The server 100 according to an embodiment may receive a request to perform contact from the user terminal 200, in operation S390. The server 100 may perform contact with one or more respondent terminals 300A, 300B, and 300C, upon reception of a request to perform contact, in operation S410.

In this case, the server 100 may perform contact considering conditions input by the user through the first interface. For example, the server 100, by considering a contact method input by the user, may perform contact with a first respondent terminal 300A by using a chat method and may perform contact with a second respondent's terminal 300B by using a voice call method. Of course, the server 100 may perform contact by further considering a contact time zone or the number of retries.

Meanwhile, the server 100 according to an embodiment may perform contact with one or more respondent terminals 300A, 300B, and 300C in parallel, sequentially, or according to a pre-input schedule.

The server 100 according to an embodiment may organize, in operation S420, the results of a contact performed in operation S410, and may provide, in operation S430, a fourth interface displaying a result of responses of one or more respondents to the scenario, to the user terminal 200.

FIG. 4 is an example of a screen 700 of the user terminal 200 on which a fourth interface is displayed, according to an embodiment.

Figure 6:
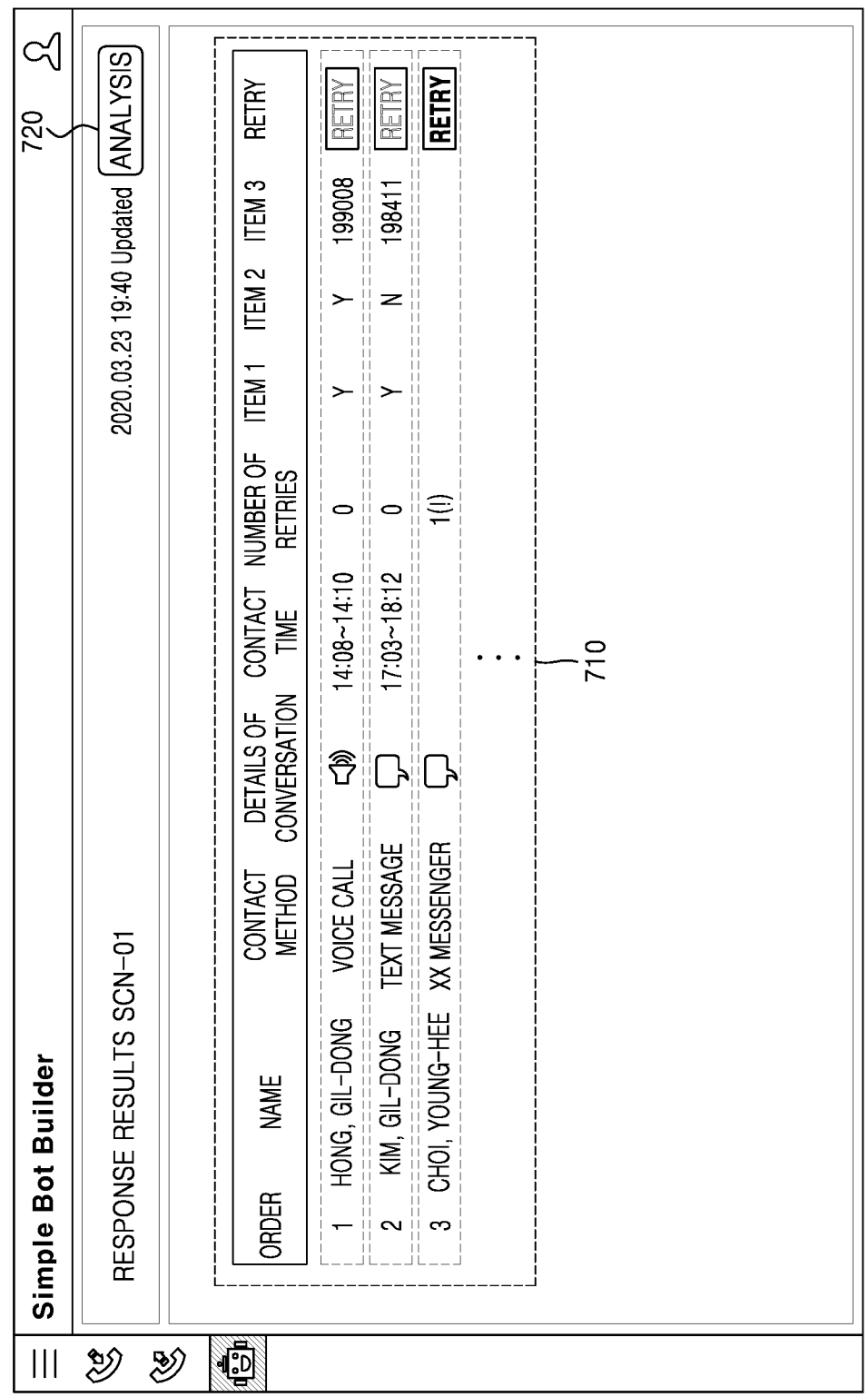
FIG. 6 shows an example of a screen of a user terminal on which a fourth interface is displayed, according to an embodiment.

Referring to FIG. 6, the fourth interface may include an interface 710 in which a contact result is displayed, and an interface 720 for requesting analysis of the contact result.

The user may check the contact result with respect to a plurality of respondents through the interface 710. For example, the user may check the time when a contact was made to each of the plurality of respondents, the number of retries, and the respondent's response to each task item.

Meanwhile, the interface 710 may include a retry interface for retrying a contact with a respondent with whom a contact has failed. The user may immediately perform contact through the retry interface, or may retry a contact according to a preset condition.

The user may analyze contact results of multiple respondents through the interface 720. For example, the server 100 may provide statistics related to respondent's responses, in response to an input to the interface 720. For example, the server 100 may provide a response distribution of the respondents for a specific task item or may provide a distribution of respondents' response time zones. However, this is merely an example, and the spirit of the present disclosure is not limited thereto.

The embodiment according to the disclosure described above may be implemented in the form of a computer program that may be executed through various components on a computer, which may be recorded in a computer-readable medium. In this case, the medium may store a program executable by a computer. Examples of media include magnetic media such as hard disks, floppy disks, and magnetic tapes, optical recording media such as compact disc read-only memory (CD-ROMs) and digital versatile discs (DVDs), magneto-optical media such as floptical disks, and a read-only memory (ROM), random-access memory (RAM), flash memory, and the like, and may be configured to store program instructions.

Meanwhile, the computer program may be specially designed and configured for the present disclosure, or may be known and usable to those of skill in the computer software field. Examples of the computer program may include not only machine language codes produced by a compiler but also high-level language codes that can be executed by a computer by using an interpreter or the like.

The specific implementations described in the present disclosure are examples, and do not limit the scope of the present disclosure in any way. For brevity of the specification, descriptions of conventional electronic configurations, control systems, software, and other functional aspects of the systems may be omitted. In addition, the connection or connection members of the lines between the components shown in the drawings exemplarily represent functional connections and/or physical or circuit connections, and may be represented as replaceable and additional various functional connections or circuit connections in an actual device. In addition, if there is no specific mention such as "essential," "important," or the like, it may not be an essential component for the application of the present disclosure.

Therefore, the spirit of the present disclosure should not be defined as being limited to the above-described embodiments, and the following claims as well as all ranges equivalent to or equivalently changed from the claims belong to the scope of the spirit of the present disclosure.

What is claimed is:

1. A device for generating a graphical interface based on user defined contact scenarios data, comprising:
   in response to a contact request from a client machine of a user, a first interface element representing codes that process the contact request and generate a first interface that prompts to the client machine to input first data indicative of one or more respondents to be contacted and second data indicative of a contact method and a contact time for each respondent;
   a second interface element representing codes that generate a second interface prompting to the client machine to input third data and receive the third data, the third data indicative of:
      a main task and one or more subtasks corelated to the main task; and
      a connection relationship, an order, or both among the main task and the subtasks;
      a task switching condition that switches to a hierarchically lower task;
   wherein the main task comprises one or more objects representing contents of one or more queries to one or more respondent,
   a third interface element representing codes that generate a third interface to be displayed side by side to the second interface and displaying information relevant to and reacting to the third data, distinguishably to the third data;
   a memory configured to store:
      the first data and the second data;
      the third data;
      the first interface element;
      the second interface element; and
      the third interface element;
   a processor coupled to the memory and configured to execute the first interface element, the second interface element, and the third interface element, such that the main task and the subtasks are carried out within settings limited by user defined contact scenarios data including the respondents to be contacted.

2. The device of claim 1, further comprises a fourth interface element representing codes that generate a fourth interface for displaying a response result of the one or more respondents.

3. The device of claim 1, wherein the first interface further comprises:
   a contact method selection interface for that prompts the client machine to select a contact method for each of the one or more respondents and input the first data;
   a contact time zone selection interface that prompts the client machine to input the second data; and
   a retry number selection interface that prompts the client machine to input a predetermined number of contact retries permitted for each respondent.

4. The device of claim 1, wherein the second interface further comprises:

a task input interface for inputting the main task and the one or more subtasks dependent on the main task;

a main task editing interface for editing the main task; and a task switching condition editing interface for inputting the task switching condition from the main task to the one or more subtasks and a response to a respondent at a time of the switching.

5. The device of claim 4, wherein the main task editing interface comprises an interface for inputting query contents for the respondent.

6. The device of claim 4, wherein the second interface further comprises a task structure window for displaying the connection relationship.

7. The device of claim 6, wherein the the task structure window is further configured to modify the first data and the second date and update the connection relationship displayed in the task structure window.

8. The device of claim 7, wherein the task structure window is further configured to display moving the one or more sub-tasks dependent on the main task together with the main task, according to a movement input of the main task by the client machine.

9. The device of claim 1, wherein the third interface further comprises a chat window for displaying a chat history relevant to the third data.

\* \* \* \* \*